Aug. 2, 1955

P. F. GOOD 2,714,647

AUTOMATIC WORK HANDLING APPARATUS

Filed Aug. 25, 1951

WITNESSES:
Robert C. Baird
R. S. Brodshaf

INVENTOR
Paul F. Good
BY
F. E. Crowder
ATTORNEY

Aug. 2, 1955  P. F. GOOD  2,714,647
AUTOMATIC WORK HANDLING APPARATUS
Filed Aug. 25, 1951  3 Sheets-Sheet 2

WITNESSES:
Robert A. Baird
R. G. Brodshl

INVENTOR
Paul F. Good.
BY
F. E. Browder
ATTORNEY

Aug. 2, 1955 P. F. GOOD 2,714,647
AUTOMATIC WORK HANDLING APPARATUS
Filed Aug. 25, 1951 3 Sheets-Sheet 3

United States Patent Office 2,714,647
Patented Aug. 2, 1955

2,714,647

AUTOMATIC WORK HANDLING APPARATUS

Paul F. Good, Baltimore, Md., assignor to Westinghouse Electric Corporation, East Pittsburgh, Pa., a corporation of Pennsylvania Application August 25, 1951, Serial No. 243,731

16 Claims. (Cl. 219—10.69)

My invention relates to an automatic workpiece handling apparatus, and more particularly to a handling apparatus for feeding workpieces to be treated to a processing apparatus, for example, a heat treating or hardening apparatus, and to subsequently receive the so treated workpieces from the processing apparatus.

In the handling of individual workpieces, such as metallic gears which are to be treated by processing apparatus such as a radio frequency heat treating machine, a problem is presented in that an untreated gear must be fed to the processing apparatus and subsequently removed in its final and treated form. In the heat treatment of metallic gears on a mass production basis, it is very desirable from a commercial standpoint to automatically feed an untreated gear to the heat treating machine and subsequently in the same manner remove a heat treated gear from the machine. One of the more generally employed heat treating machines of the type under consideration has a workpiece support spindle, which is axially movable to carry a workpiece into and out of an induction heating coil. Further, if it is desirable to harden the metallic gear, the workpiece support spindle is also adapted to move the heated gear from the induction heating coil into a quench member, the latter usually being in the form of a quench ring which is adapted to spray a coolant against the heated surface of the gear. The use of an automatic handling apparatus for feeding and removing metallic gears from a gear treating machine is estimated to increase the effective output of the latter gear treating machine at least by about 10%. The use of an automatic handler has a further advantage that one human operator is able to conveniently operate in the order of six gear treating machines, instead of the previous three gear treating machines if hand loading methods are employed.

Accordingly, it is an object of my invention to provide an automatic work handler or loader for feeding workpieces to a processing machine.

It is a further object of my invention to provide a loader for feeding metallic gears to a heat treating machine, and subsequently removing the treated metallic gears from that machine.

It is another object of my invention to provide a workpiece loader, which places an untreated workpiece on the workpiece support spindle of a machine such as a high frequency heat treating machine and subsequently removes the treated workpiece from the work support spindle at the end of the operation.

It is still another object of my invention to increase the production of prior art workpiece treating machines.

It is a still further object of my invention to increase the operative efficiency of the human operators of workpiece heating machines.

It is an additional object of my invention to provide an automatic loader for feeding metallic gears to a gear hardening machine, said loader being adapted for use with a plurality of different sized metallic gears.

In accordance with my invention I provide an automatic loader for feeding metallic gears to and from a gear hardening machine or similar apparatus, said loader comprising a pair of workpiece magazines, one of said magazines being adapted for dispensing untreated gears to the gear treating machine and the second of said magazines being adapted for receiving treated gears from the gear treating machine. The two said magazines are commonly supported by a rotatable support member, the latter support member having at least a first and a second position. In its first position, the workpiece dispensing magazine is positioned relative to a workpiece support spindle such that a workpiece is fed to the spindle. Then the workpiece support spindle axially moves to subject the workpiece to the prescribed and desired treatment in the gear treating machine. By the end of this treatment, the rotatable support member is in the second of its said positions, and the workpiece receiving magazine is operative to remove the treated workpiece from the workpiece support spindle.

The novel features that I consider characteristic of my invention are set forth with particularity in the appended claims. The invention itself, however, both as to its organization and its method of operation, together with additional objects and advantages thereof, will best be understood from the following description of specific embodiments when read in connection with the accompanying drawings in which:

Figure 1:
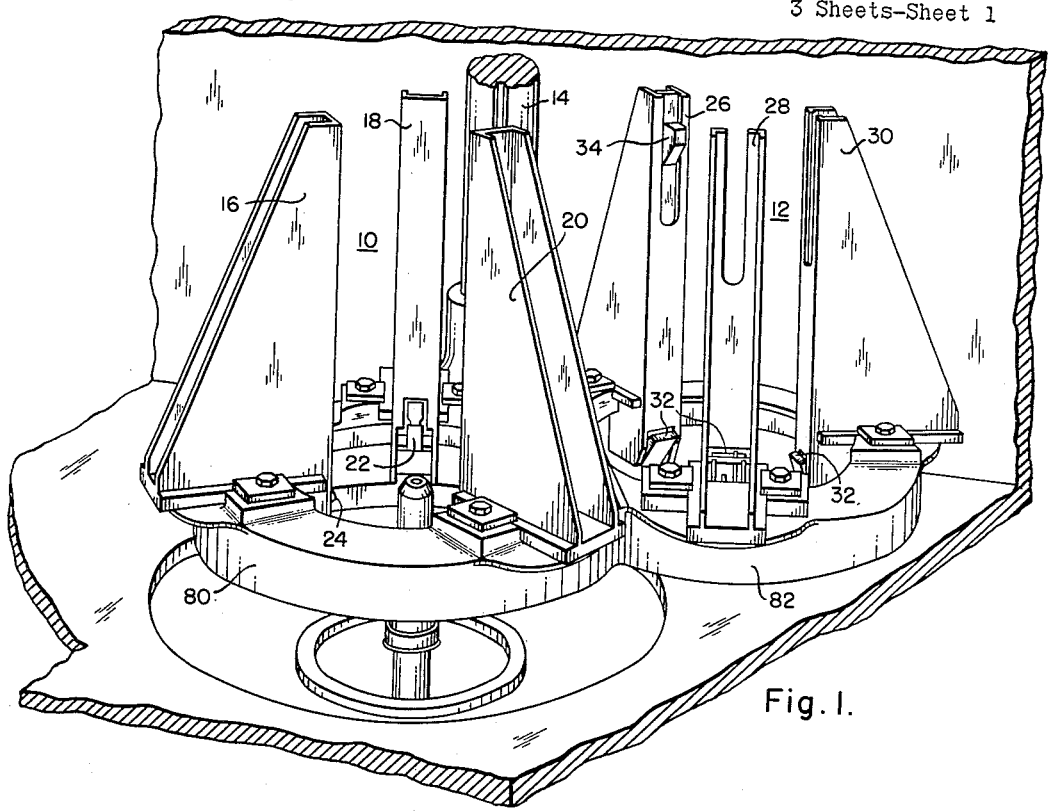
Figure 1 is a perspective view of my automatic loader, showing the workpiece magazines.

In Fig. 1 there is shown a workpiece dispensing magazine 10 and a workpiece receiving magazine 12 which are commonly supported by a rotatable support member 14. The workpiece dispensing magazine 10 has a plurality of workpiece guide members 16, 18 and 20, three being shown in Fig. 1. Each of the latter workpiece guide members is radially adjustable relative to the axis of the workpiece dispensing magazine 10. Each of the workpiece guide members 16, 18 and 20 of the workpiece dispensing magazine 10 has a workpiece release member 22, the latter being illustrated in Fig. 2, and subsequently described relative to Fig. 2. At least one of the workpiece guide members, with one of them being predetermined, has an electrical limit switch 24 to determine the movement of the workpieces through the workpiece dispensing magazine 10, and to stop the operation of the apparatus when the supply of workpieces in particularly the workpiece dispensing magazine 10 is exhausted.

A workpiece receiving magazine 12 is provided, this magazine 12 having a plurality of workpiece guide members 26, 28 and 30, three being illustrated in Fig. 1. Each of these workpiece guide members is radially adjustable relative to the axis of the workpiece receiving magazine 12. Also each of the workpiece guide members has a workpiece retaining member 32, the latter being illustrated in detail in Fig. 3 and will be subsequently described relative to Fig. 3 of the drawings.

A rotatable support member 14, in the form of a vertically positioned shaft, is provided and commonly supports the workpiece dispensing magazine 10 and the workpiece receiving magazine 12. As illustrated in Fig. 1, the rotatable support member 14 is vertically positioned; however, it is to be understood that this member could be horizontally positioned or positioned at any angle between the horizontal and vertical, providing obvious modifications of the workpiece magazines are made such as workpiece retaining members being provided in the outermost ends of the workpiece guide members relative to the base part of the respective magazines supporting these workpiece guide members. A workpiece movement limit switch 34 is provided with the workpiece receiving magazine 12 at the outermost ends of one of the workpiece guide members, said end being the end furthest remote from the base portion of the workpiece receiving magazine 12 supporting said workpiece guide member 26.

Figure 2:
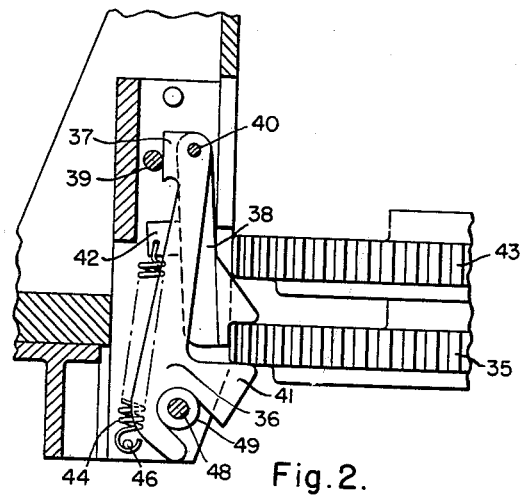
Fig. 2 is a sectional view of particularly the workpiece release member employed with the workpiece dispensing magazine.

In Fig. 2 there is shown in greater detail the workpiece release member 22 employed with the workpiece dispensing magazine 10. A support latch 36 is provided to support a column of workpieces in the workpiece dispensing magazine 10. A trip arm 38 is pivotally fastened to the upper end of the support latch 36 by means of an interconnecting pin 40, said trip arm 38 having an extension 42 to which a tension spring member 44 is connected, the lower end of the tension spring member 44 being connected to a fixed pin 46 in the body of each respective workpiece guide member 16, 18 or 20. A lower support pin 48 is provided to operate in conjunction with the support latch 36, and limit the lowermost position of the support latch 36. This lower support pin 48 carries a roller member 49, which serves as a guide for the lower end of the support latch 36.

Figure 3:
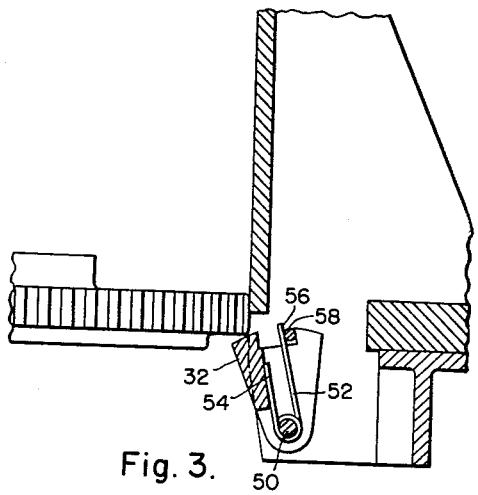
Fig. 3 is a sectional view of particularly the workpiece retaining member employed with the workpiece receiving magazine.

In Fig. 3 there is shown a workpiece retaining member 32, which is pivotally fastened by means of a connecting pin 50 to the respective workpiece guide members 26, 28 or 30 of the workpiece receiving magazine 12. A torsional spring 52 is wrapped around this connecting pin 50 and has one end 54 pressing against a portion of the workpiece retaining member 32 and its second end 56 bearing against a fixed position pin 58 in the body of the respective workpiece guide members 26, 28, and 30. The pin 58 also limits the extension of the workpiece retaining member 32.

Figure 4:
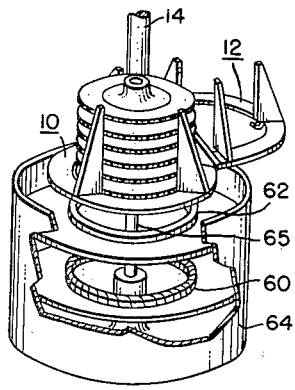
Fig. 4 is a perspective view of my loader, which illustrates the position of the workpiece dispensing magazine, when the workpiece support spindle is in the position to be fed a workpiece for treatment.

In Fig. 4 there is illustrated the initial loading position, in which the workpieces are adapted to be fed to the workpiece treating machine. As illustrated in Fig. 4, the workpiece treating machine may, for example, comprise a radio frequency induction heating coil 60 and a fluid quench member 62, which are positioned within a fluid quench retaining sink 64 as commonly employed in metallic gear hardening machines. The workpieces are supported by a workpiece support spindle 65.

Figure 5:
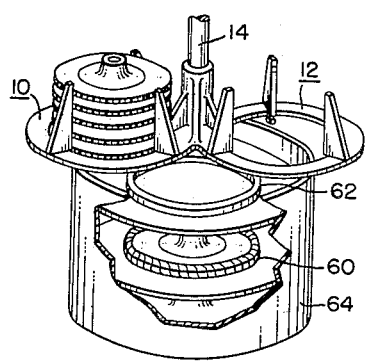
Fig. 5 is a perspective view, which illustrates the position of the workpiece magazine when the workpiece support spindle has carried a workpiece into position for treatment.

In Fig. 5 there is illustrated an intermediate position of the workpiece magazines relative to the workpiece treating machine. In this position, workpieces, such as metallic gears may be undergoing any desired treatment by the gear treating machine.

Figure 6:
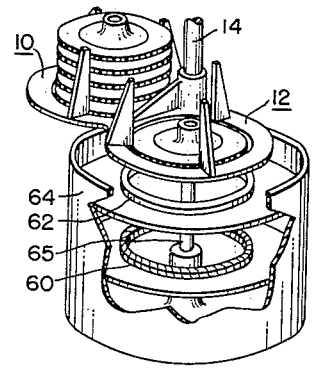
Fig. 6 is a perspective view, which illustrates the relative positions of the workpiece magazines when the workpiece support spindle is in position to deliver a treated workpiece to the receiving magazine.

In Fig. 6 there is illustrated the unload position of the workpiece magazines, at which a workpiece may be removed from the workpiece treating machine.

Figure 7:
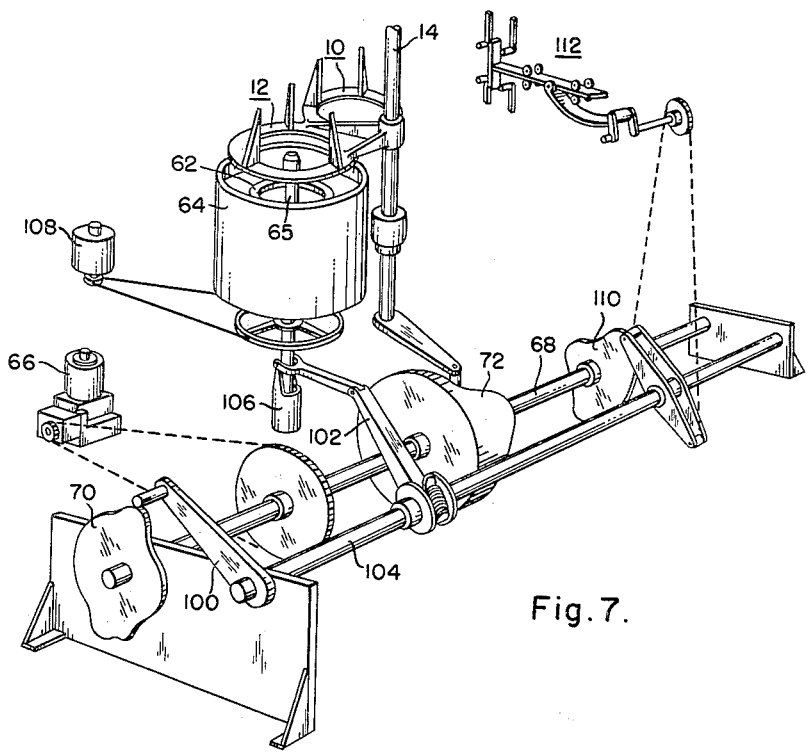
Fig. 7 illustrates the mechanical drive system which is employed to govern the operation of the rotatable support member through its various positions, and to axially move the workpiece support spindle in conjunction with the movement of the workpiece magazines supported by said rotatable support member.
Figure 8:
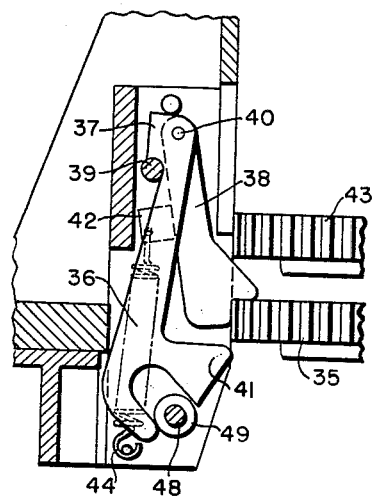
Fig. 8 is a sectional view of particularly the workpiece release member showing the support latch in its upper position.
Figure 9:
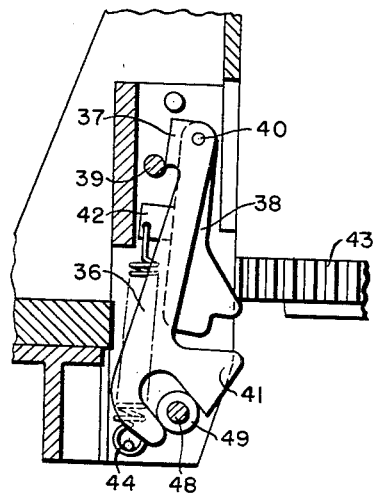
Fig. 9 is a sectional view of particularly the workpiece release member showing the support latch in an intermediate position.
Figure 10:
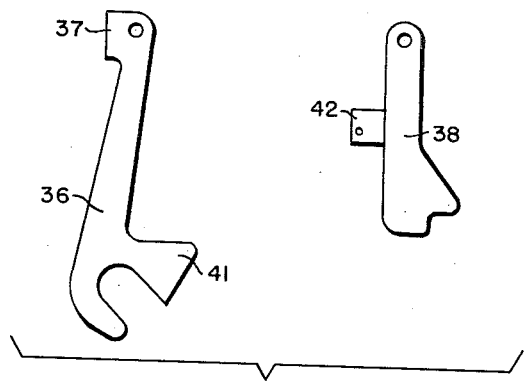
Fig. 10 shows the support latch per se and the trip arm per se.

In Fig. 7 there is illustrated the mechanical drive system employed with the automatic workpiece loaded and in accordance with my invention, a drive motor 66 is shown connected to a common drive shaft 68, and on the latter drive shaft there is employed a plurality of cam members. A first cam member 70, operative through suitable connection arms 100 and 102 and apparatus 104 and 106, axially moves the workpiece support spindle 65 into and out of the respective workpiece magazines such that a workpiece may be removed from the workpiece dispensing magazine 10, passed into a high frequency induction heating coil (not shown) and through a quenching operation, if desired, and subsequently returned to the workpiece receiving magazine 12. A second drive motor 108 rotates the workpiece support spindle 65 through a suitable mechanical drive arrangement. A second cam member 72 is provided for rotating the rotatable support member 14 through its various positions, such that in one position of the rotatable support member 14 the workpiece dispensing magazine 10 is coaxially positioned relative to the workpiece support spindle 65 so the first cam member 70 can vertically lift the workpiece support spindle 65 into operative position with a workpiece carried by the workpiece dispensing magazine 10 and remove a workpiece to be treated by the gear treating machine from the latter magazine. The second cam member 72 positions the rotatable support member 14 such that the workpiece magazines 10 and 12 move into the position illustrated in Fig. 5 after a workpiece has been so removed. In the latter position the workpiece can be heat treated by the high frequency induction coil 60 and quench hardened by the provided fluid quench means 62. It is to be understood that soaking and similar operations may be employed, and the second cam member 72 may be provided with a suitable control surface to arrange the necessary timing of the workpiece magazine movement and the first cam member provided with a suitable control surface to provide the desired workpiece support spindle movement, in a manner which should be well understood to a person skilled in this art. A third cam member 110 has a contour surface which controls the operation of an electrical switch mechanism 112 through a suitable mechanical drive arrangement. This switch mechanism 112 can be employed to control the high frequency currents which are supplied to the induction heating coil 62, if desired.

As the heating and quenching operations are completed on the workpiece, the rotatable support member 14 is positioned by the second cam member 72 to place the workpiece receiving magazine 12 into its position as shown in Fig. 6. The first cam member 70 then raises the workpiece support spindle 65 and the treated workpiece is fed to the workpiece receiving magazine 12. The workpiece support spindle 65 is then lowered, and the workpiece retaining members 32 retain the workpiece within the workpiece receiving magazine 12.

In accordance with the more detailed operation of my invention, a supply of workpieces is axially placed in the workpiece dispensing magazine 10. The workpiece dispensing magazine 10, operating on the rotatable support member 14, is then positioned coaxially respecting the workpiece support spindle 65 by means of the second cam member 72. The workpiece support spindle 65 is then raised such that it contacts a workpiece, and raises the column of such workpieces within the workpiece dispensing magazine 10 a distance of approximately one-half inch. As shown in Fig. 2, when the lowermost workpiece 35 in the column is raised in this manner, the trip member 38 is raised, lifting the support latch 36 such that an upper extending arm 37 on the support latch 36 catches a support pin 39 which is fixedly fastened to the body of its workpiece guide member. As the support latch 36 is raised, the fixed lower support pin 48 causes the latch extension 41 of the support latch 36 to move out of the way of the axial passage of the lowermost gear 35. The workpiece support spindle 65 is then lowered by means of the first cam member 70 and the lowermost gear 35 is removed from the workpiece dispensing magazine 10. The gear 43 which was previously adjacent to the lowermost, and now removed, gear 35 moves the trip arm 38 about a fulcrum provided between a surface of the workpiece guide member and the extension 42 of the trip arm 38 which is connected to the tension spring 44. This forces the upper extension 37 of the support latch 36 away from its support pin 39 and allows the support latch 36 to be pulled into its lower position by the tension spring member 44 to effectively extend the latch extension 41 into supporting position for the above said adjacent gear 43, such extension being determined by the lower support pin 48.

During the period of the above operation the workpiece magazines were in the relative position shown in Fig. 4. The workpiece support spindle 65 next lowers the workpiece 35 which it now carries into the induction heating coil 60 where the workpiece is heated, and, if desired, remains in this position while the workpiece undergoes any desired "soaking" operation during which time the surface heat of the workpiece is conducted into the interior of the workpiece. Then the work support spindle 65 moves the workpiece 35 into a quench member 62 where a quenching medium, such as a coolant fluid, is applied to the heated surface of the workpiece 35 to effectively harden it. It is to be understood by those skilled in the art that a second stage of induction heating may be employed, following the initial heating of the workpiece, and that the second induction heating stage which, for example, may be at a higher frequency than the initial heating stage, may be either physically above or below the initial induction heating coil 60. Also the quenching member 62 may be above or below the initial induction heating coil 60, or if more than one stage of induction heating is employed, above or below the so combined induction heating stages.

After the desired heating operation is completed on the workpiece 35, and, if the workpiece is to be hardened, the desired quenching operation is completed, the work support spindle 65 raises the workpiece 35 to deliver it to the workpiece receiving magazine 12. During the heating and quenching operations, the workpiece magazines may have assumed the relative positions shown in Fig. 5. When the desired heating and quenching operations are completed and the work support spindle 65 raises the workpiece 35 from the induction heating coils or quench member, depending upon which is employed for the final operation, the workpiece magazines assume the position shown in Fig. 6, workpiece receiving magazine 12 and the work support spindle 65 are coaxially positioned. As the work support spindle 65 raises the workpiece 35, the latter enters the workpiece receiving magazine 12 and is moved in an upward direction parallel to the workpiece guide members 26, 28 and 30. After the workpiece 35 has been raised by the work support spindle 65 to a position which is above the workpiece retaining members 32, the workpiece support spindle 65 is lowered and moves out of contact with the workpieces 35 as the workpiece is caught and retained in the workpiece receiving magazine 12 by the workpiece retaining members 32.

The above cycle may be repeated for each workpiece. After the workpiece support spindle 65 is lowered and moves out of contact with the workpiece 35, which has been delivered to the workpiece receiving magazine 12, the workpiece magazines are moved to the relative positions shown in Fig. 4, and the workpiece support spindle 65 is again raised by the first cam member 70 such that another workpiece 43 is removed from the workpiece dispensing magazine 10, is passed through the heating and quenching operations as may be desired, and is delivered to the workpiece receiving magazine 12 in the previously described manner.

The workpiece guide members for each of the workpiece magazines 10 and 12 are fastened to the respective magazine base members 80 and 82, by means of bolts or like members and overlapping plates, which provide an adjustable fastener for each workpiece guide member.

In this manner the workpiece guide members may be adjusted radially relative to their respective magazines, such that workpieces having various diameters may be handled by the respective workpiece magazines 10 and 12. Further, the workpiece dispensing magazine 10 is provided with limit switches 24 at the outlet of this magazine, said limit switches being operable to indicate when the supply of workpieces in the workpiece dispensing magazine 10 is exhausted. The workpiece receiving magazine 12 is similarly provided with workpiece-movement limit switches 34, near its opening opposite the workpiece inlet, such that an indication is given, or the apparatus can be made inoperative, when the workpiece receiving magazine 12 is filled to the desired capacity with treated workpieces.

In its more specific aspects, my invention may be primarily applied to the automatic handling of workpieces such as metallic gears, as applied to the heat treatment or hardening treatment of such workpieces. In its broader aspects my invention is also applicable to the handling of workpieces having a great variety of physical dimensions and material composition. It is to be further understood that the relative movement of the workpiece magazines 10 and 12, as carried by the rotatable support member 14, may be readily adapted in a manner which should be readily understood by those skilled in the art to accomplish the desired automatic handling of workpieces. For example, the workpiece magazines 10 and 12 may assume any number of various positions, and not necessarily be limited to the positions illustrated in Figs. 4, 5 and 6, so long as the workpiece dispensing magazine 10 is in the desired position when the workpiece carrying spindle 65 is raised to remove a workpiece therefrom, and the workpiece receiving magazine 12 is in the desired position when the workpiece support spindle 65 is raised to deliver a treated workpiece thereto. It is to be further understood that workpiece handling apparatus in accordance with my invention is not limited to feeding gears to a heat treating or hardening machine, but is readily adaptable to supplying workpieces, such as gears or gear blanks or similar workpieces, to a cutting, shaving or other types of processing machines.

While I have shown and described certain specific embodiment of my invention, many modifications thereof are possible. For example, I have shown the workpiece magazines supported and operated by means of a rotatable support member 14; however, the magazines could also be mounted in such a way that they could be reciprocated on a track or other suitable means for proper positioning and timing with respect to the workpiece support spindle. My invention, therefore, is not to be restricted except as is necessitated by the prior art and by the spirit of the appended claims.

I claim as my invention:

1. In combination, a workpiece dispensing member, a workpiece receiving member, a rotatable support member commonly supporting said workpiece dispensing and workpiece receiving members, and a workpiece carrying spindle adapted to remove workpieces from said workpiece dispensing member and to deliver said workpieces to said receiving member.

2. The combination of a workpiece dispensing member, a workpiece receiving member, a rotatable support member common to said workpiece dispensing and workpiece receiving members, a workpiece carrying spindle, said support member having at least two operative positions, a first of said positions being such that said workpiece dispensing member is in such a position that the spindle may remove a workpiece therefrom, and a second of said positions being such that the workpiece receiving member is in such a position that the spindle may deliver a workpiece thereto.

3. In combination, a workpiece carrying spindle having an axis, a workpiece dispensing member having an axis and a workpiece receiving member having an axis, a rotatable support member operative to commonly support said workpiece dispensing and workpiece receiving members, said support member having at least two operative positions, a first of said positions being such that the axis of the spindle is coincident with the axis of the workpiece dispensing member and a second of said positions being such that the axis of the spindle is coincident with the axis of the workpiece receiving member.

4. The apparatus of claim 3 characterized by said spindle being adapted for supporting the respective workpieces from their central portions and said workpiece dispensing and workpiece receiving members being adapted for supporting said workpieces from their respective outermost portions.

5. In a workpiece magazine having an axis and adapted for use in the handling of a plurality of workpieces, the combination of a plurality of workpiece guide members which guide said workpieces along said axis, and a workpiece release mechanism operable with at least one of said guide members, said mechanism including a support latch member, a trip arm fastened to said latch member, and a support pin for said latch member and adapted to selectively render said latch member inoperable, said trip arm being operable to determine the operation of said latch member in response to the relative positions of said workpieces along said axis.

6. The apparatus of claim 5, characterized by said trip arm being pivotally fastened to said latch member, and said latch member having an extension which is operable to catch said support pin and render said latch member inoperable when the latch member is so caught.

7. The apparatus of claim 10 characterized by said support member having at least a first and a second operative position, the first position being such that the first workpiece magazine is positioned relative to said spindle such that the latter can remove a workpiece from the former, and the second position of said support member being such that the second workpiece magazine is positioned relative to the spindle such that the latter can deliver a workpiece to the former.

8. The apparatus of claim 10 characterized by the first workpiece magazine having an axis and the second workpiece magazine having an axis and the spindle having an axis with said support member having at least a first and a second operative position, the first operative position being such that the axis of the spindle is coaxial with the axis of the first workpiece magazine and the second operative position being such that the axis of the spindle is coaxial to the axis of the second workpiece magazine.

9. In combination, a workpiece dispensing member, a workpiece receiving member and a rotatable support member commonly provided for said workpiece dispensing and workpiece receiving members, said rotatable support member having at least three operative positions, a workpiece carrying spindle, one of said positions being such that said spindle and said workpiece dispensing member are relatively positioned such that the workpiece carrying spindle may remove workpieces from said workpiece dispensing member, a second position such that said workpiece carrying spindle and said workpiece receiving member are relatively positioned for the said spindle to deliver workpieces to said workpiece receiving member and a third of said positions being intermediate respecting said first and second positions.

10. In combination, a first workpiece magazine for initially holding untreated workpieces, a second workpiece magazine for holding treated workpieces, a rotatable support member which commonly supports each of said workpiece magazines, a workpiece support spindle having an axis, said spindle being adapted for movement along its axis relative to the first and second workpiece magazines such that the spindle respectively moves into each of said magazines in handling each workpiece.

11. In workpiece handling apparatus, the combination of a workpiece dispensing member, a workpiece receiving member, a rotatable support member commonly supporting said workpiece dispensing and workpiece receiving members, and a workpiece carrying spindle having an axis and being movable along this axis respectively to remove workpieces from said workpiece dispensing member and to deliver said workpieces to said receiving member.

12. In workpiece handling apparatus, the combination of a workpiece dispensing member, a workpiece receiving member, a rotatable support member common to said workpiece dispensing and workpiece receiving members, a workpiece carrying spindle having an axis and being movable along said axis, said support member having at least two operative positions, with a first of said positions being such that said workpiece dispensing member is located relative to said axis so the spindle by movement along said axis may remove a workpiece from said workpiece dispensing member, and with a second of said positions being such that the workpiece receiving member is located relative to said axis so the spindle by movement along said axis may deliver a workpiece to said workpiece receiving member.

13. In workpiece handling apparatus, the combination of a workpiece carrying spindle having an axis and being movable along that axis, a workpiece dispensing member having an axis, a workpiece receiving member having an axis, a rotatable support member commonly supporting said workpiece dispensing and workpiece receiving members, said support member having at least two operative positions, with a first of said positions being such that the axis of the spindle is coincident with the axis of the workpiece dispensing member, and with a second of said positions being such that the axis of said spindle is coincident with the axis of said workpiece receiving member, said workpiece carrying spindle being movable along its axis to respectively remove workpieces from the workpiece dispensing member and to deliver workpieces to the workpiece receiving member.

14. The apparatus of claim 13, with the workpiece carrying spindle being movable along its axis when the support member is in the first of said positions to remove a workpiece from the workpiece dispensing member, and with the spindle being movable along its axis when the support member is in the second of said positions to deliver a workpiece to the workpiece receiving member.

15. In workpiece handling apparatus, the combination of a workpiece dispensing member, a workpiece receiving member, a rotatable support member commonly supporting said workpiece dispensing and workpiece receiving members, a workpiece carrying spindle having an axis and being movable along said axis respectively to remove workpieces from said workpiece dispensing member and to deliver said workpieces to said workpiece receiving member, and an inductor member having an axis and being positioned coaxially relative to said workpiece carrying spindle.

16. The apparatus of claim 15, with said workpiece carrying spindle being movable along its axis through said inductor member respectively to remove workpieces from said workpiece dispensing member and to deliver said workpieces to said receiving member.

References Cited in the file of this patent

UNITED STATES PATENTS

| 1,855,441 | Crouse | Apr. 26, 1932 |
| 1,876,960 | Kenworthy | Sept. 13, 1932 |
| 1,904,198 | Brand | Apr. 18, 1933 |
| 1,958,845 | Burns | May 15, 1934 |
| 2,345,937 | Joa | Apr. 4, 1944 |
| 2,454,039 | Cox | Nov. 16, 1948 |
| 2,549,975 | Knitter | Apr. 24, 1951 |
| 2,556,214 | Pottle | June 12, 1951 |

FOREIGN PATENTS

| 102,427 | Sweden | Aug. 26, 1941 |